Sept. 6, 1927.
H. A. SANGREN
1,641,785
OPHTHALMIC MOUNTING
Filed Dec. 18, 1925
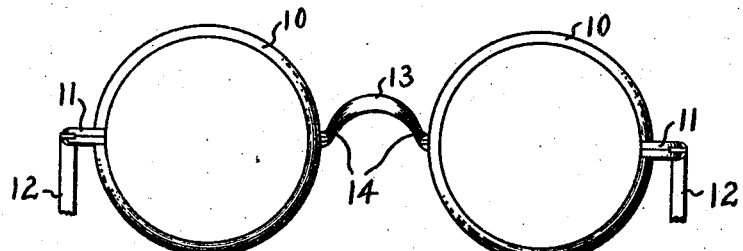
Fig.1.
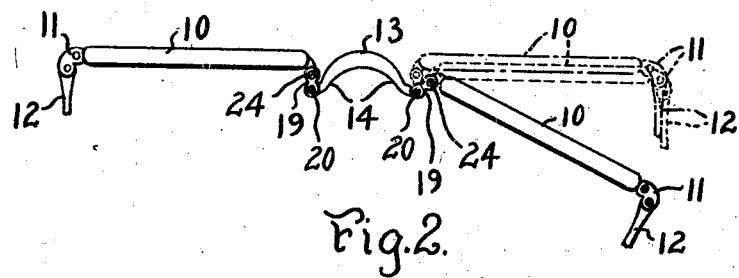
Fig.2.
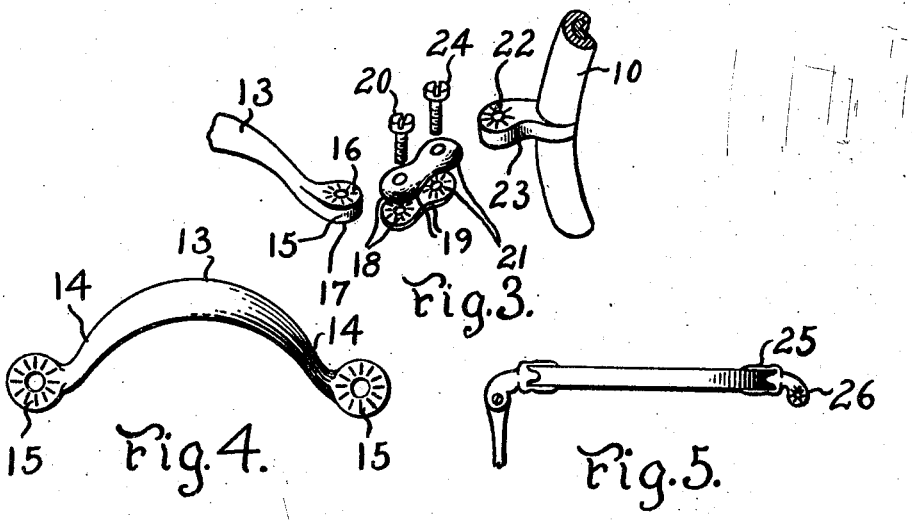
Fig.3.
Fig.4.
Fig.5.
Inventor
Harry A. Sangren.
By Harry H. Styll
Attorney Patented Sept. 6, 1927.

1,641,785

UNITED STATES PATENT OFFICE.

HARRY A. SANGREN, OF SOUTHBRIDGE, MASSACHUSETTS, ASSIGNOR TO AMERICAN OPTICAL COMPANY, OF SOUTHBRIDGE, MASSACHUSETTS, A VOLUNTARY ASSOCIATION OF MASSACHUSETTS.

OPHTHALMIC MOUNTING.

Application filed December 18, 1925. Serial No. 76,224.

This invention relates to improvements in ophthalmic mountings and has particular reference to an improved form of bridge construction for the same.

One of the leading objects of the present invention is to provide means for positioning the lenses of an ophthalmic mounting before the eyes of the wearer.

A further object of the present invention is to provide means whereby parts of ophthalmic mountings of different styles and sizes may be interchangeable.

Other objects and advantages of my improved construction should be readily apparent by reference to the following specification taken in connection with the accompanying drawings, in which similar characters designate similar parts throughout, the preferred form of the invention only having been shown and described by way of illustration.

Referring to the drawings:

Figure 1 is a front elevation of a spectacle embodying the invention,

Figure 2 is a top plan view of the spectacle showing the adjustment of same,

Figure 3 is a detail perspective view,

Figure 4 is a view showing a separate bridge member,

Figure 5 is a view showing a frameless mounting.

In the fitting of ophthalmic mountings it has been found that the facial characteristics of individuals vary as to width of nose, pupillary distance, overhang of eyebrow and so forth. To meet these various requirements it has been necessary for the dealer to carry a stock of mountings of different sizes and shapes of bridges, etc., and even with these it has been necessary to bend the bridges considerably to adjust the mounting to the face of the wearer. In my invention I have provided means whereby the lenses may be angled before the eye as desired, the distance between the eyes may be regulated, and the desired shape of bridge fitted. My invention also permits of a bridge of desired style and dimensions being used either with a rimless type of mounting or with a rim type of mounting, as desired. Therefore, my invention provides interchangeable bridges of various styles, permitting of any desired adjustment of the lenses, in, out, up, or down, and by which the proper pupillary distance may be accurately provided.

Another great advantage of my invention is that it provides means whereby a great saving in investment by the dealer may be made. He will not have to carry in stock such a large assortment of styles and sizes as has formerly been the case.

Referring to the drawings, the numeral 10 is employed to denote the usual eye wires or lens frames of a spectacle mounting, having the end pieces 11 for the temples 12, the said temples being adapted to retain the mounting in position on the face of the wearer by engagement with the ears.

Disposed centrally of the mounting and between the pair of lens rims or frames 10 is my improved adjustable bridge member 13, having the arms 14 terminating in the apertured ends 15, the said apertured ends 15 having the notched faces 16 and 17, respectively, on the upper and lower sides, contacting with and adapted to interlock with the notched faces 18 carried by the split link members 19 through the clamp screw 20.

The notched faces 21 carried by the opposite ends of the split link 19 are adapted to engage and interlock with the notched faces 22 of the apertured lugs 23 carried by the eye wires or frames 10. A second screw 24 is used to clamp these members together.

The operation of the invention is as follows: To adjust the bridge member to form a wider distance between the lenses, the screw 20 is loosened to disengage the notched faces 16 and 17 with 18, and the link 19 along with the frame 10 is swung about the screw 20 as a pivot until the screw 24 occupies the desired position laterally, after which the screw 20 is again tightened. The lens rim or frame 10 will then be set off at an undesired angle. To bring the lens rim or frame back to its required position in relation to the face of the wearer the screw 24 is loosened and the lens rim of the frame adjusted similarly to the adjustment at the screw 20, after which the screw 24 is tightened. The notched faces tend to interlock with each other and hold the frame in positive alignment.

It will readily be seen that with this construction any size of bridge member 13, as shown in Figure 4, may be interchanged by removing the said screws 20 and replacing the undesired bridge member 13 with the one desired. This not only provides a bridge of the desired width but one also having the desired in and out dimensions.

A rimless mounting as shown in Figure 5 may be used in connection with the adjustable bridge by having the strap 25 provided with a notched and apertured lug 26, the said lug being adapted to be used and connected in the same manner as the lug 23 on the lens rims or frames 10.

From the above it will be readily appreciated that there has been provided a structure which will accomplish all of the objects and perform all the functions set forth. It is also to be understood that various modifications may be found desirable in the construction and arrangement of parts, and the right is hereby reserved to make such changes as properly fall within the scope of the appended claims without departing from or exceeding the spirit of the invention.

Having described the invention, what is claimed is:

1. In a device of the character described, a bridge having a serrated lug, a lens rim member having a serrated lug, a link member having serrated portions engaging the serrated lugs of the first two portions, and clamping means for securing the serrated portions together.

2. In a device of the character described, a pair of lens rims having serrated lugs, a bridge member having a serrated lug on each end, link members having serrated portions engaging the serrated lugs of the bridge and rim member, and clamping means for holding the various serrated portions in alignment.

3. In a device of the character described, a bridge having a lug with serrations on two sides thereof, a lens rim having a lug having serrations on two sides thereof, a split link member having serrations adapted to engage the serrations of the bridge and rim, respectively, and clamping means for holding the serrated portions of the link and bridge and of the link and rim member in alignment.

4. In a device of the character described, a bridge having an end bearing member, a lens rim member having a lug with a bearing member, a link member having bearings adapted to engage the bridge and rim member bearings, and clamping means to hold the respective bearings together.

5. In a device of the character described, a bridge having a pivotal bearing member, a lens rim having a pivotal bearing member, a link member having pivotal bearings adapted to engage the bridge and rim member bearings respectively, and clamping means to hold the respective bearings together and to permit pivotal adjustment about the respective pivotal bearings.

HARRY A. SANGREN.